United States Patent [19]

Elversson

[11] 4,054,264
[45] Oct. 18, 1977

[54] TOOL FOR MOVING A LONG FLEXIBLE LEADING WIRE THROUGH HOLLOW PASSAGES

[76] Inventor: Tord Elversson, Akargatan 19, S-828 00 Edsbyn, Sweden

[21] Appl. No.: 748,141

[22] Filed: Dec. 6, 1976

[51] Int. Cl.² .............................................. E21B 9/00
[52] U.S. Cl. .......................................... 254/134.3 FT
[58] Field of Search ............... 254/134.3 FT, 134.3 R, 254/106, 29 R; 226/127; 15/104.3 SN

[56] References Cited

U.S. PATENT DOCUMENTS

| | | | |
|---|---|---|---|
| 1,982,402 | 11/1934 | Shade | 15/104.3 SN |
| 3,834,668 | 9/1974 | Casey | 254/29 R |

Primary Examiner—Robert C. Watson
Attorney, Agent, or Firm—Anthony S. Zummer

[57] ABSTRACT

This invention relates to a tool for moving a long flexible wire through hollow passages of different kinds. Such tools may be used in connection with the drawing of electric cables in conduits, but also in connection with cleaning or other treatment of conduits having so small dimensions that they are not accessible in another way than by such a wire. The tool comprises two tubes being telescopically movable in relation to each other in order to feed the leading wire. The improvement according to the invention consists in a retaining mechanism designed in such a manner that the tool is capable of feeding the leading wire into as well as out of conduits or the like.

18 Claims, 12 Drawing Figures

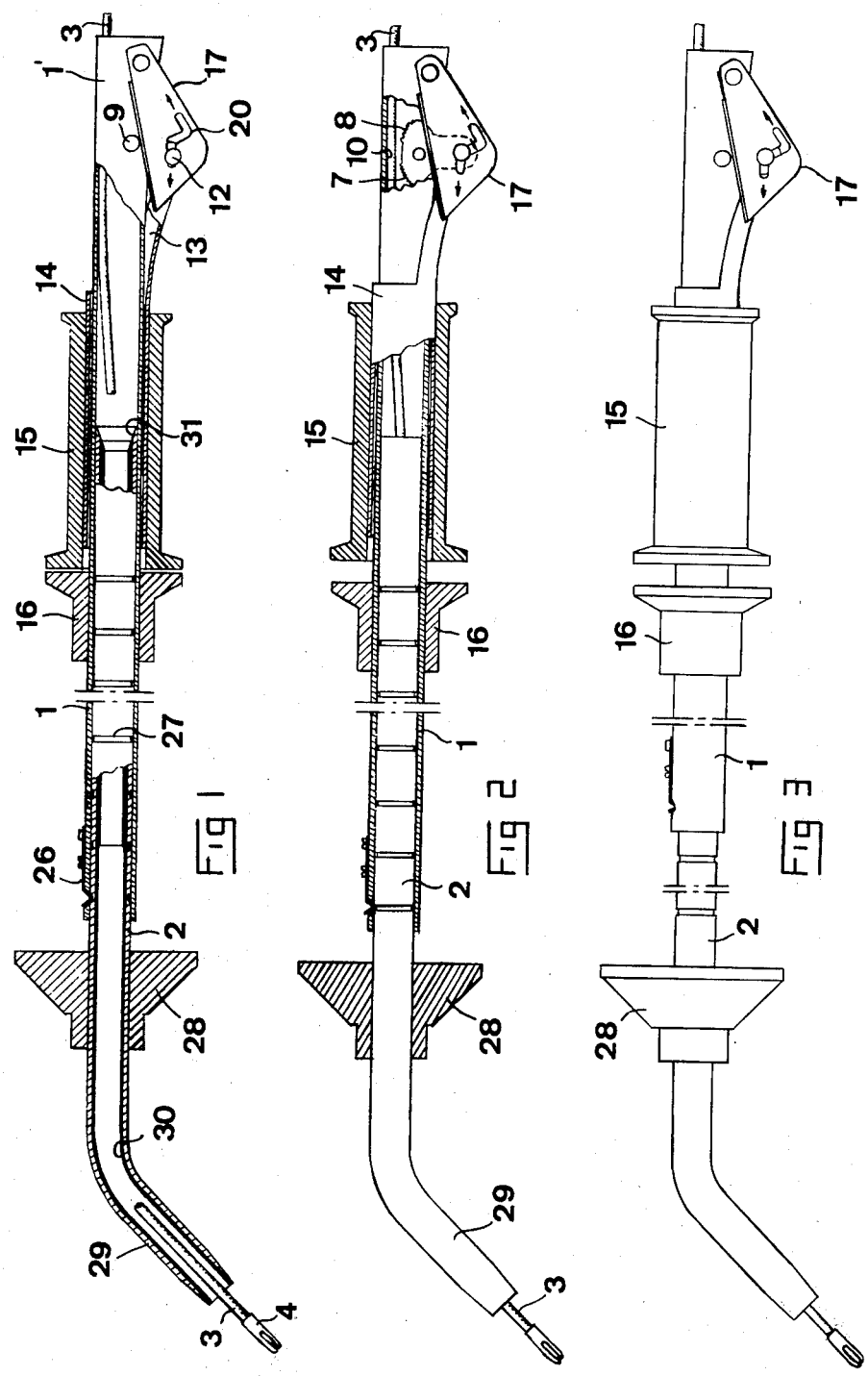

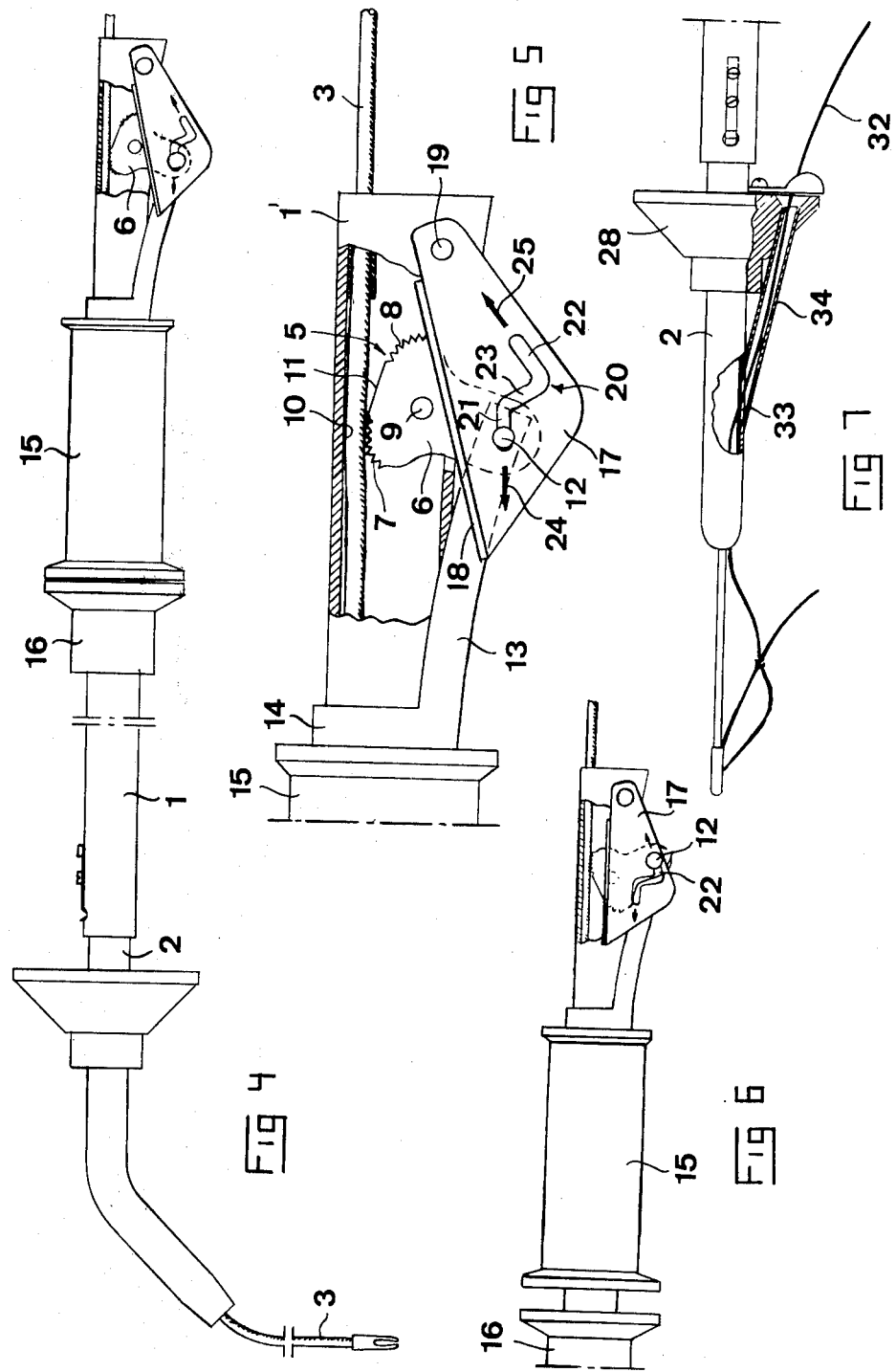

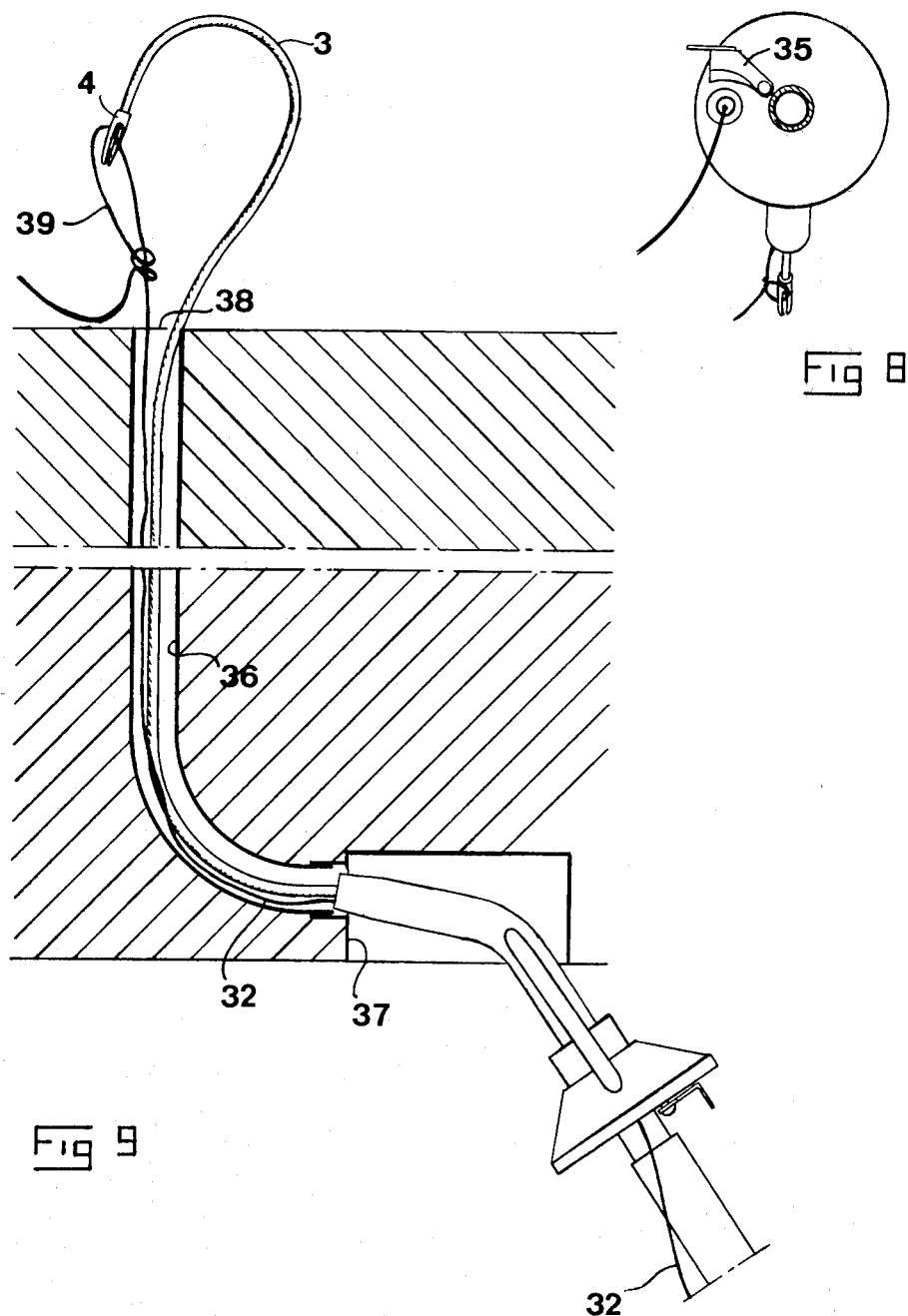

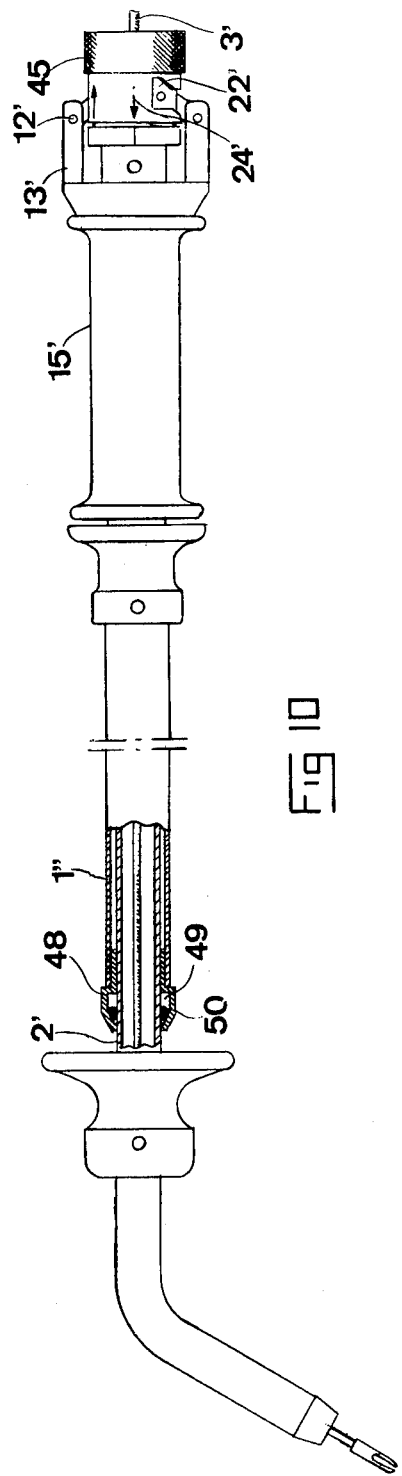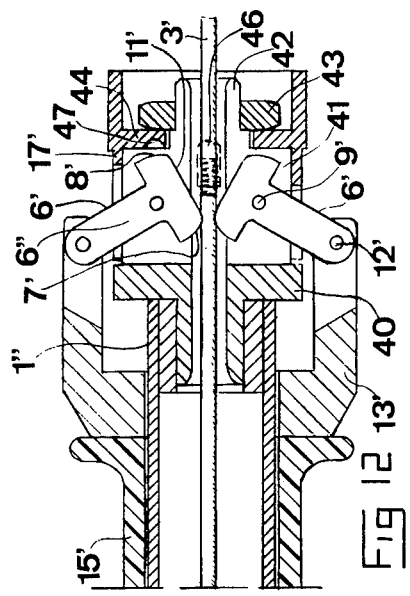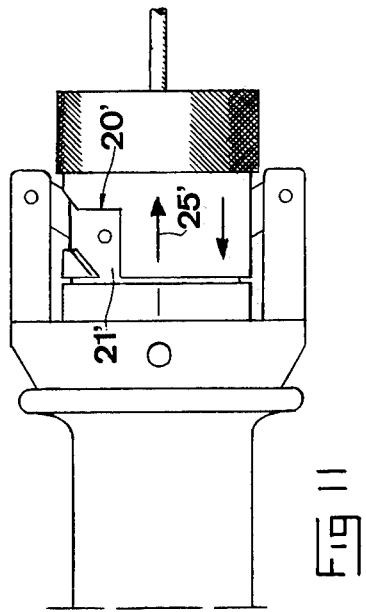

TOOL FOR MOVING A LONG FLEXIBLE LEADING WIRE THROUGH HOLLOW PASSAGES

This invention relates to a tool for moving a long flexible wire through hollow passages of different kinds. Such tools may be used in connection with the drawing of electric cables in hidden conduits, but also in connection with cleaning or other treatment of conduits having so small dimensions that they are not accessible in another way than by such a wire.

Tools for the above purpose are previously known. For instance, the Swedish patent specification No. 140 707 discloses a tool comprising two tubes being telescopically movable in relation to each other and denominated feed tube and guide tube respectively, the feed tube being associated with a retaining mechanism which, on one hand, is arranged to seize the wire and firmly connect the same to the feed tube during the displacement thereof in a first direction in relation to the guide tube, but on the other hand, on displacement of the feed tube in an opposite second direction, leave the hold of the wire so as to allow the last-mentioned displacement without conveying the wire. Though this tool permits a more efficient method of working than a simple manual insertion of the wire into the conduit, the same is, however, concomitant with a plurality of disadvantages. I.a. the retaining mechanism thereof merely permits feeding of the wire in one direction through the tool, i.e., into the conduit or passage, the extraction of the wire from the passage compulsorily having to be done by hand without the assistance of the tool. This is often laborious to perform because the wire is usually difficult to seize by the hand. Thus, the wire is comparatively thin and suitably it has a slippery surface in order to facilitate as far as possible the conveying of the wire in the passage. Further, the tool relies upon the operator holding the wire with one of his fingers during the return of the wire between two feeding movements. This manual holding of the wire may on one hand be troublesome to perform appropriately at all times and on the other hand cause physiological disabilities to the operator.

The present invention aims at eliminating the above disadvantages and to this end it relates to a tool being characterized by the fact that the retaining mechanism comprises at least one locking body having two spaced apart seizing areas and being adjustable into two different working positions or ranges, said locking body, on one hand, in a first working position, attending to the conveyance of the wire on displacement of the feed tube in the first direction in relation to the guide tube and the release of the wire from the engagement with the feed tube on the displacement thereof in the opposite direction in relation to the guide tube, and on the other hand, in a second working position, attending to a conveyance of the wire on displacement of the feed tube in said second direction in relation to the guide tube and release of the wire from the engagement with the feed tube on displacement thereof in said first direction in relation to the guide tube. Thereby the tool can feed the wire into as well as out of the passage in question.

When a wire has been mentioned here, this conception is used in the form that has gained a standing in the practical field of the art. In order to attain a more logical lucidity, the object in question will hereinafter be denominated leading wire due to the leading or guiding nature thereof. The leading wire may in its practical realization consist of any arbitrary element being long and flexible, though it has to have sufficient stiffness for being capable of being pushed through passages of different kinds. Thus, the conception leading wire should be taken in its broadest sense.

With reference to the attached drawings, a closer description of two embodiments of the invention will follow below.

In the drawings:

FIG. 1 is a side elevation mainly sectioned and partially cut illustrating a first embodiment of the tool according to the invention during a first working phase;

FIG. 2 is a similar elevation during a second working phase;

FIG. 3 is a side elevation of the same tool during a third working phase and

FIG. 4 is a similar elevation of the tool during a fourth working phase;

FIG. 5 is an enlarged sectioned side elevation showing the retaining mechanism according to the invention;

FIG. 6 is a side elevation of the rear part of the tool illustrating how the retaining mechanism has been adjusted into a second working range or position diverging from the position shown in FIGS. 1 - 5;

FIG. 7 is a partially sectioned elevation from above showing the front part of the tool;

FIG. 8 is a cross section in FIG. 7;

FIG. 9 is a section through a passage illustrating how the tool is used for drawing cables;

FIG. 10 is a partially sectioned side elevation illustrating an alternative embodiment of the tool having two locking bodies;

FIG. 11 is an enlarged side elevation of the rear part of the tool according to FIG. 10 with the locking bodies in a first working position; and FIG. 12 is a section through the retaining mechanism with the locking bodies in a second working position.

The tool according to the invention (see FIGS. 1 to 5) comprises two tubes 1, 2 being telescopically movable relative to each other and denominated feed tube and guide tube respectively. The feed tube 1 is arranged exteriorly of the guide tube 2 and presents at the rear end thereof a flattened portion 1'. A leading wire 3 runs through the two tubes, the frontal extremity of said wire in this case presenting a claw 4, to which the frontal extremity of a cable to be drawn can be hooked or attached. Advantageously, the leading wire 3 may consist of a plastic element having a circular cross section and a cross sectional diameter of 1 to 5 mm and a length adapted for the purpose. In practice, the length of the plastic element 3 may amount to 5 to 25 m.

Instead of a leading wire having a circular cross section, it is however also possible to use a wire having a different cross section shape, for instance a flattened, oval or rectangular shape.

A retaining mechanism generally designated 5 (see FIG. 5) is associated with the feed tube 1, the main part of said mechanism consisting of a locking body 6 provided with two spaced apart seizing areas 7 and 8. The locking body 6 is pivotally mounted on a shaft or pivot pin 9 supported by the two opposite walls of the flattened end portion 1' of the feed tube. The two seizing areas 7, 8 can co-operate with an abutment 10 which in this case consists of the inner wall of the feed tube. Between the two seizing areas 7, 8 there is a linear portion 11 of the very locking body 6, said portion allowing the leading wire 3 to pass freely between the locking body and the abutment when the locking body is in a position perpendicularly to the abutment. The two seizing areas 7, 8 advantageously consisting of toothings or knurlings have a curved profile shape.

In the vicinity of its lower extremity, the locking body 6 is, by a guide pin 12, hingedly connected to an arm 13 projecting obliquely rearwardly and downwardly from a sleeve 14 (see FIGS. 1 and 2), which is displaceable a defined distance to and fro along the feed tube 1. On the sleeve 14 there is fixed a handle 15 preferably made of rubber. The movement of the sleeve and the handle in the direction forwardly along the feed tube 1 is limited by the leading wire 3 being clamped by the locking body 6. Thus, when the handle 15 is moved forwardly the seizing area 7 of the locking body is pivoted against the leading wire while continuously increasing the clamping thereof until it finally no longer will be possible to further move the handle forwardly. A holder or ring 16 made of plastic or hard rubber is fixed on the feed tube 1. This ring 16 has the purpose of facilitating, when required, a holding of the locking body in the position in which the leading wire is locked by co-operation with a similar ring portion on the handle. In practice, this is performed by the operator pressing with his fingers the ring portion of the handle towards the ring 16. It is obvious that the locking body 6 as illustrated in FIG. 5 is in a first seizing position when the handle 15 is in the operating position shown in FIG. 1, namely moved towards the ring 16, and that the same locking body as shown in FIG. 2 is in a neutral position when the handle 15 is in the operating position illustrated in FIG. 2, namely displaced a distance from the ring 16.

For readjusting the locking body 6 from one working position to another, a reversing means 17 is provided consisting of a plate having a holding flange 18, said plate being pivoted on a shaft 19 at the end portion 1' of the feed tube. A slot generally designated 20 is recessed in the plate 17, a projection associated with the locking body 6 engaging said slot. This projection suitably consists of the guide pin 12 previously mentioned.

The slot 20 has three branches or portions 21, 22 and 23, the two first mentioned of which extend in certain angles out from the intermediate branch 23 interconnecting the two branches 21 and 22. The extension of the intermediate slot branch 23 substantially coincides with an arc line having a radius equal to the distance between the guide pin 12 and the pivot axis 19 of the reversing plate when the guide pin is in the neutral position of the locking body. When the guide pin engages the slot branch 21 the reversing plate 17 and accordingly also the locking body are readjusted for feeding the wire 3 forwardly as indicated by the arrow 24. Inversely, the reversing plate 17 (and of course the locking body 6) is readjusted for feeding the wire 3 rearwardly as indicated by the arrow 25 when the guide pin 12 engages the slot branch 22.

On the feed tube 1 a pressure spring 26 is provided in the form of a plate spring engaging transverse recesses or indents 27 in the envelope surface of the guide tube 2 with an easy contact pressure. The aim of this spring engagement between the feed tube and the guide tube is to make the resistance to displacement of the feed tube in relation to the guide tube greater than the resistance to displacement of the sleeve 14 in relation to the feed tube, thereby ensuring that the handle 15 and the sleeve 14 are brought to a correct operating position before the displacement of the feed tube in relation to the guide tube is initiated. Though a spring and co-operating indents have been provided in the embodiment shown, other means are also conceivable in order to perform the same function; for instance a frictional engagement between the feed tube and the guide tube.

In the vicinity of its frontal extremity, the guide tube 2 has a collar 28 serving in practice as a front stop for the feed tube 1 as well as a grip portion for one of the operator's hands (for right-handed persons the left hand grips the collar 28 while the right hand grips the handle 15). The collar 28 advantageously consists of an annular body.

The guide tube 2 has a curved or bent frontal extremity 29 in order to provide at least a slight friction between the guide tube and the leading wire passing therethrough. Thereby it is ensured that the leading wire is not unintentionally moved on the return movement of the feed tube after a feeding movement. This friction-increasing effect may be further enhanced by providing at least the frontal extremity of the guide tube with a friction-increasing lining 30 on the inner side of the tube. The lining 30 may for example consist of glass fibre, textile or the like.

In order to facilitate the insertion of the leading wire 3 into and through the guide tube 2, the rearward mouth of the guide tube may be fashioned with a conical entrance surface 31.

In FIGS. 7 and 8, a preferred embodiment for drawing a cable designated 32 is illustrated. In this embodiment, a pipe 34 is connected to a side aperture 33 in the frontal extremity of the guide tube, said pipe extending from the aperture to the collar 28 of the guide tube, said collar being cut through by the pipe so that it will open on the back of the collar. On the back of the collar a cutting means 35 for cutting off the cable 32 is arranged, said means being created in a suitable manner. Advantageously, the cable 32 may be wound onto a storage bobin (not shown) disposed for instance underneath the guide tube. In a similar manner it is also possible to arrange the leading wire 3 on a storage bobin connected to the feed tube.

Though it is preferred to carry the cable 32 through a pipe 34 in the manner described, it is per se conceivable to pass in the cable directly through the aperture 33 or to connect the cable directly to the claw 4 of the leading wire without passing the cable through the orifice of the guide tube.

The tool described operates in the following manner.

It is assumed that the leading wire 3 is to be fed in a first direction from behind and forwardly through the tool, i.e., into the passage or conduit in which a cable shall be drawn. In FIG. 1 the tool is shown in a phase when the feed tube 1 is pushed forwardly as far as possible towards the collar 28 and the handle 15 as well as the sleeve 14 thereof are pushed forwardly towards the ring 16. In this position, the locking body 6 is in a seizing position providing an engagement between the leading wire 3 and the feed tube 1 (cf. FIG. 5). In order to attend to the feeding of the leading wire 3 one step forward the feed tube 1 now has to be returned to a position drawn away from the collar 28. As shown in FIG. 2, this is performed by moving the handle 15 rearwardly from the ring 16, whereby the handle via the sleeve 14, the arm 13 and the guide pin 12 causes the locking body 6 to pivot to the neutral position shown in FIG. 2 in which the engagement between the locking body and the leading wire ceases. On continued drawing of the handle 15 rearwardly away from the collar 28, the feed tube 1 follows to the position shown in FIG. 3. This conveyance of the feed tube is attended to by the sleeve 14 being stopped in its movement in relation to the feed tube by means of the pin 12, which has been moved to the end of the first slot branch 21, the reversing plate 17 then serving as a stop for the movement of the sleeve 14 in relation to the feed tube. It is apparent that the return of the feed tube 1 from the collar 28 is done without conveying the leading wire. When the feed tube has reached its end position (which is decided by the operator) the handle 15 is displaced in the opposite direction. Hereupon the locking body 6 is, as illustrated in FIG. 4, brought to its seizing position in which the leading wire 3 is held in relation to the feed tube. On continued displacement of the handle towards the collar 28, the feed tube 1 follows and a leading wire part corresponding to the travel performed is fed out of the orifice of the guide tube 2 as shown in FIG. 4.

It should be noted that the spring 26 always ensures that the handle 15 assumes the correct operating position before the relative movement between the feed tube and the guide tube is initiated.

In FIG. 6 it is shown how the reversing plate 17 has been readjusted in order to get the locking body 6 to work in the second working range thereof. In this case the reversing plate has been pivoted upwardly about the shaft 19 thereof so as to locate the guide pin 12 to the second slot branch 22. In this position, a withdrawal of the handle 15 from the collar 28 means that the locking body will engage the leading wire 3 so that this can follow the feed tube in the movement thereof rearwardly from the collar 28. Inversely, the locking body 6 will return to the neutral position as soon as the handle is moved forwardly in relation to the feed tube so that the leading wire 3 runs free of the locking body on movement of the feed tube towards the collar 28. Hence the leading wire 3 can positively be fed back through the tool.

FIG. 9 illustrates the use of the tool according to the invention in connection with drawing a cable 32 through a conduit 36 from a box 37 (disposed for instance in a wall of a room in a building) to an orifice 38 (in another room of the building). The conduit 36 can run in many curves. The cable 32 is provided with a loop 39 which is hooked onto the front claw 4 of the leading wire 3. The leading wire is fed in a manner previously described from the box 37 to the orifice 38, where the cable automatically leaves its engagement with the leading wire since the leading wire is bent back as illustrated in the drawing so that the claw is turned backwards and the loop is released. This means that the cable is passed through the conduit at the same time as the leading wire and that the leading wire can be returned to the box 37 without making it necessary for the operator to move between the different rooms in order to tamper with the cable. Thus, from one single place, the operator can attend to the passing of the cable through the conduit to the place intended.

In practice the leading wire can be fed and returned respectively with a speed amounting to several meters per minute.

Reference is now made to FIGS. 10 to 12 illustrating an alternative embodiment of the invention. In this case, the reversing means consists of a sleeve 17' which is rotatable to and fro relative to the feed tube 1". Two opposite locking bodies 6' are associated with this reversing means, said locking body being arranged to seize and holding the leading wire 3' between each other. Similarly to the locking body 6 previously described, each of these locking bodies has a linear portion 11' and two seizing areas 7', 8' on each side of this portion. Likewise, the locking bodies are pivoting on shafts 9' and by pins 12' they are pivotably connected to arms 13' projecting rearwardly from the handle 15'.

As best shown in FIG. 12, the sleeve 17' is rotatably arranged exteriorly of a core-like part 40 rigidly attached to the extremity of the feed tube 1", for instance by a screw connection. In the core part 40, there is a central slit 41 housing the locking bodies 6', the shaft 9' extending between the two opposite walls of the core part defining the slit 41. The core part has a threaded extension 42 on which a locking nut 43 is secured. Between the locking nut and the very core part 40, a flange 44 extending across the length of the sleeve 17' is held. Hence also the sleeve itself is held on the core part. On the sleeve, there is a knurled surface 45 intended to facilitate the holding of the sleeve on rotating the same.

In the sleeve 17', two slots 20' analogous to the slot 20 previously described are recessed, each of said slots having three branches, namely a first branch 21' (see FIG. 11) extending parallel to the longitudinal direction of the leading wire and intended for feeding the leading wire forwardly, a second branch 22' (see FIG. 10) likewise extending parallel to the leading wire and intended for feeding the leading wire rearwardly and a third transverse branch (FIG. 11) interconnecting the two branches 21' and 22'. When the sleeve 17' is adjusted in the position shown in FIGS. 10 and 12 with the locking bodies 6' engaging the first branches 21' of the slots 20', it is evident that the leading wire 3' can be fed forwardly as indicated by the arrow 24' in FIG. 10. A readjustment of the feed direction is simply performed by rotating the sleeve so that the locking bodies will engage the second branches 22' of the slots 20' as indicated by the arrow 25' in FIG. 11.

It should be observed that the projection in the form of the guide pin 12 engaging the slot 20 in the embodiment shown in FIGS. 1 to 5 corresponds to the elongated portion 6" of the very locking body 6' projecting away from the areas 7', 8' and 11' in the embodiment shown in FIGS. 10 to 12.

In order to make certain that the sleeve 17' is held in the position intended, a spring-loaded ball 46 may advantageously be provided as indicated by the dotted lines in FIG. 12, said ball engaging either of two seats 47 recessed in the flange 44, said seats defining the adjustment positions.

The embodiment shown in FIGS. 10 to 12 is additionally modified in comparison with the embodiment shown in FIGS. 1 to 5 inasmuch as the means for making the resistance to displacement of the feed tube in relation to the guide tube greater than the resistance to displacement of the handle 15 in relation to the feed tube has been given a different design. Thus, in this case the guide tube 2' has a completely smooth envelope surface, while the feed tube 1" at the front is provided with a bushing 48 having an internal annular groove 49. An endless elastic ring 50, preferably made of rubber, is inserted into the groove 49, said ring having a smaller width than the groove 49. As long as this ring is anywhere between the two ends of the groove it will, by pressing between the outer surface of the guide tube and the inner surface of the groove, provide a slight locking of the feed tube in relation to the guide tube, but as soon as the ring is brought to one or the other of the two ends of the groove, the locking effect will cease and the feed tube can be moved in relation to the guide tube with a rather slight effort.

The advantages of the invention are evident inasmuch as the leading wire can be quickly and efficiently moved forwardly as well as rearwardly.

Of course the invention is not limited merely to the embodiment described above and shown in the drawings. Thus, it is conceivable to use the tool for other purposes than just leading cables. The tool may for instance be used for cleaning conduits of different kinds, a suitable cleaning member, e.g., a brush or the like, being used instead of an attachment claw. Also other modifications of the invention are conceivable within the scope of the following claims.

I claim:

1. Tool for moving a long flexible leading wire through hollow passages, e.g., in order to draw electric cables through hidden conduits or the like, comprising two tubes being telescopically movable in relation to each other and denominated feed tube and guide tube respectively, the feed tube being associated with a retaining mechanism which, on one hand, is arranged to seize the leading wire and firmly connect the same to the feed tube during the displacement thereof in a first direction in relation to the guide tube, but on the other hand, on displacement of the feed tube in an opposite second direction, leave the hold of the leading wire so as to allow the last-mentioned displacement without conveying the leading wire, characterized in that the retaining mechanism comprises at least one locking body having two spaced apart seizing areas and being adjustable into two different working positions or ranges, said locking body, on one hand, in a first working position attending to the conveyance of the leading wire on displacement of the feed tube in the first direction in relation to the guide tube and the release of the leading wire from the engagement with the feed tube on the displacement thereof in the opposite second direction in relation to the guide tube, and on the other hand, in a second working position attending to a conveyance of the leading wire on displacement of the feed tube in said second direction in relation to the guide tube and release of the leading wire from the engagement with the feed tube on displacement thereof in said first direction in relation to the guide tube, whereby the tool can feed the leading wire into as well as out of said passage, the locking body is mounted pivoting about an axis extending across the feed direction of the leading wire and co-operates with an abutment in order to on one hand, allow free relative movement of the leading wire between the locking body and the abutment when the locking body assumes a neutral position of pivoting, in which the two seizing areas of the body are located at approximately equal distances from the abutment, and on the other hand clamp the leading wire between the abutment and either of the seizing areas of said body by the locking body being pivoted about its axis from said neutral position to a seizing position.

2. Tool according to claim 1 wherein the abutment consists of the inside wall of the feed tube.

3. Tool according to claim 1 wherein the locking body is pivotable between the neutral position and either of said seizing positions by means of a suitably sleeve-shaped handle which is movable on the feed tube between two spaced-apart positions of operation an hingedly connected to the locking body by a guide pin located at a distance from the pivot axis of the body.

4. Tool according to claim 1, wherein a reversing means is mounted on the feed tube for adjusting the locking body from one working position to another, said reversing means being movable in relation to the feed tube and presenting a slot having three branches, a projection of the locking body engaging said slot, and that two of the branches extend at angles to the third branch which interconnects the two first-mentioned branches, said locking body being adjusted in a first working position when said projection is in the first slot branch, in a second working position when the projection is in the second slot branch and in its neutral position as long as the projection is in the third intermediate slot branch.

5. Tool according to claim 4, wherein said reversing means consists of a plate being pivotable about a shaft in relation to the feed tube and that the projection of the locking body consists of a portion of the guide pin between the handle and the locking body, the extension of said third slot branch substantially coinciding with an arc line having a radius equal to the distance between the pivot axis of the reversing plate and guide pin when the latter is in the neutral position of the locking body.

6. Tool according to claim 4, wherein the reversing means consists of a sleeve being rotatable to and fro relative to the feed tube, the slot being recessed in said sleeve, and that the projection of the locking body engaging the slot consists of an extension of the locking body.

7. Tool according to claim 6, wherein two opposite locking bodies are associated with the reversing means, said bodies cooperating in order to seize the leading wire.

8. Tool according to claim 7, wherein the sleeve is rotatably arranged exteriorly of a core-like part attached to an extremity of the feed tube and presenting a central slit in which the locking bodies are housed, the first two slot branches extending substantially parallel to the longitudinal direction of the feed tube and the third slot branch extending across the longitudinal direction of the first-mentioned branches.

9. Tool according to claim 8, wherein the sleeve has a flange extending across the longitudinal direction of the sleeve, said flange, for holding the sleeve, being arranged between the core part and a locking nut applied to a threaded extension of the core part.

10. Tool according to claim 3, wherein on the feed tube there is provided a holder arranged to co-operate with the handle when moving the handle towards the holder in order to hold the locking body in a position in which the leading wire is locked.

11. Tool according to claim 3, wherein means are provided for making the resistance to displacement of the feed tube in relation to the guide tube greater than the resistance to displacement of the handle relative to the feed tube, thereby ensuring that the handle and accordingly also the locking body assume the correct operating position before the displacement of the feed tube relative to the guide tube is initiated.

12. Tool according to claim 11, wherein said means comprises at least one pressure spring attached to the feed tube and engaging transverse recesses in the envelope surface of the guide tube with an easy contact pressure.

13. Tool according to claim 11, wherein said means comprises an endless elastic ring disposed in an annular notch in the inside of the feed tube, said notch having a greater width than the elastic ring.

14. Tool for moving a long flexible leading wire through hollow passages, e.g., in order to draw electric cables through hidden conduits or the like, comprising two tubes being telescopically movable in relation to each other and denominated feed tube and guide tube respectively, the feed tube being associated with a retaining mechanism which, on one hand, is arranged to seize the leading wire and firmly connect the same to the feed tube during the displacement thereof in a first direction in relation to the guide tube, but on the other hand, on displacement of the feed tube in an opposite second direction, leave the hold of the leading wire so as to allow the last-mentioned displacement without conveying the leading wire, characterized in that the retaining mechanism comprises at least one locking body having two spaced apart seizing areas and being adjustable into two different working positions or ranges, said locking body, on one hand, in a first working position attending to the conveyance of the leading wire on displacement of the feed tube in the first direction in relation to the guide tube and the release of the leading wire from the engagement with the feed tube on the displacement thereof in the opposite second direction in relation to the guide tube, and on the other hand, in a second working position attending to a conveyance of the leading wire on displacement of the feed tube in said second direction in relation to the guide tube and release of the leading wire from the engagement with the feed tube on displacement thereof in said first direction in relation to the guide tube, whereby the tool can feed the leading wire into as well as out of said passage, the guide tube has a curved or bent frontal extremity in order to provide at least a slight friction between the guide tube and the leading wire passing therethrough, thereby ensuring that the leading wire is not unintentionally moved on the return movement of the feed tube after a feeding movement, the frontal extremity of the guide tube is provided with a friction-increasing lining on the inner side thereof.

15. Tool for moving a long flexible leading wire through hollow passages, e.g., in order to draw electric cables through hidden conduits or the like, comprising two tubes being telescopically movable in relation to each other and denominated feed tube and guide tube respectively, the feed tube being associated with a retaining mechanism which, on one hand, is arranged to seize the leading wire and firmly connect the same to the feed tube during the displacement thereof in a first direction in relation to the guide tube, but on the other hand, on displacement of the feed tube in an opposite second direction, leave the hold of the leading wire so as to allow the last-mentioned displacement without conveying the leading wire, characterized in that the retaining mechanism comprises at least one locking body having two spaced apart seizing areas and being adjustable into two different working positions or ranges, said locking body, on one hand, in a first working position attending to the conveyance of the leading wire on displacement of the feed tube in the first direction in relation to the guide tube and the release of the leading wire from the engagement with the feed tube on the displacement thereof in the opposite second direction in relation to the guide tube, and on the other hand, in a second working position attending to a conveyance of the leading wire on displacement of the feed tube in said second direction in relation to the guide tube and release of the leading wire from the engagement with the feed tube on displacement thereof in said first direction in relation to the guide tube, whereby the tool can feed the leading wire into as well as out of said passage, the guide tube in the vicinity of its frontal extremity has a collar serving as a front stop for the feed tube and suitably also as a grip portion for one of the operator's hands.

16. Tool for moving a long flexible leading wire through hollow passages, e.g. in order to draw electric cables through hidden conduits or the like, comprising two tubes being telescopically movable in relation to each other and denominated feed tube and guide tube respectively, the feed tube being associated with a retaining mechanism which, on one hand, is arranged to seize the leading wire and firmly connect the same to the feed tube during the displacement thereof in a first direction in relation to the guide tube, but on the other hand, on displacement of the feed tube in an opposite second direction, leave the hold of the leading wire so as to allow the last-mentioned displacement without conveying the leading wire, characterized in that the retaining mechanism comprises at least one locking body having two spaced apart seizing areas and being adjustable into two different working positions or ranges, said locking body, on one hand, in a first working position attending to the conveyance of the leading wire on displacement of the feed tube in the first direction in relation to the guide tube and the release of the leading wire from the engagement with the feed tube on the displacement thereof in the opposite second direction in relation to the guide tube, and on the other hand, in a second working position attending to a conveyance of the leading wire on displacement of the feed tube in said second direction in relation to the guide tube and release of the leading wire from the engagement with the feed tube on displacement thereof in said first direction in relation to the guide tube, whereby the tool can feed the leading wire into as well as out of said passage, the guide tube has an aperture in the tube wall for the insertion of one or more cables or the like into the guide tube for simultaneous feeding of the leading wire and the cable out of the output orifice of the guide tube.

17. Tool according to claim 16, wherein a pipe is connected to the aperture, said pipe extending from said aperture to the collar of the guide tube.

18. Tool according to claim 17, wherein a cutting means is associated with the collar for cutting off the cable inserted in the guide tube.

* * * * *

UNITED STATES PATENT OFFICE
CERTIFICATE OF CORRECTION

PATENT NO. : 4,054,264
DATED : October 18, 1977
INVENTOR(S) : Tord Elversson

It is certified that error appears in the above-identified patent and that said Letters Patent are hereby corrected as shown below:

Column 7, Line 66, "an" should be --and--.

Column 8, Line 6, "of" should be --on--.

Signed and Sealed this

Seventh Day of February 1978

[SEAL]

Attest:

RUTH C. MASON
Attesting Officer

LUTRELLE F. PARKER
Acting Commissioner of Patents and Trademarks